United States Patent
Arase et al.

(10) Patent No.: US 8,568,094 B2
(45) Date of Patent: Oct. 29, 2013

(54) GAS TURBINE AND METHOD FOR OPENING CHAMBER OF GAS TURBINE

(75) Inventors: Kenichi Arase, Hyogo (JP); Eigo Katou, Hyogo (JP); Masato Takeuchi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 573 days.

(21) Appl. No.: 12/863,718

(22) PCT Filed: Jan. 27, 2009

(86) PCT No.: PCT/JP2009/051277
§ 371 (c)(1),
(2), (4) Date: Jul. 20, 2010

(87) PCT Pub. No.: WO2009/107437
PCT Pub. Date: Sep. 3, 2009

(65) Prior Publication Data
US 2010/0296926 A1    Nov. 25, 2010

(30) Foreign Application Priority Data
Feb. 28, 2008  (JP) .................................. 2008-048250

(51) Int. Cl.
*F01D 25/24*    (2006.01)
(52) U.S. Cl.
USPC ..................................... 415/213.1; 415/214.1
(58) Field of Classification Search
USPC .......... 415/213.1, 214.1, 215.1; 403/335, 336
See application file for complete search history.

(56) References Cited

U.S. PATENT DOCUMENTS

| | | | | |
|---|---|---|---|---|
| 3,842,595 A | * | 10/1974 | Smith et al. | 60/804 |
| 4,320,903 A | * | 3/1982 | Ayache et al. | 277/418 |
| 4,417,878 A | | 11/1983 | Koren | |
| 4,425,079 A | * | 1/1984 | Speak et al. | 415/139 |
| 4,435,121 A | * | 3/1984 | Wosika | 415/198.1 |
| 4,657,482 A | * | 4/1987 | Neal | 415/176 |
| 4,716,721 A | * | 1/1988 | Pask et al. | 60/796 |
| 4,840,026 A | * | 6/1989 | Nash et al. | 60/770 |
| 5,230,540 A | * | 7/1993 | Lewis et al. | 285/363 |

(Continued)

FOREIGN PATENT DOCUMENTS

| | | |
|---|---|---|
| JP | 11324796 A | 11/1999 |
| JP | 2000-171038 A | 6/2000 |

(Continued)

OTHER PUBLICATIONS

Notice of Allownce corresponding to KR 2010-7019075, dated Sep. 17, 2012.

(Continued)

*Primary Examiner* — Edward Look
*Assistant Examiner* — Liam McDowell
(74) *Attorney, Agent, or Firm* — Lowe, Hauptman & Ham

(57) ABSTRACT

A gas turbine includes a rotor rotated by combustion gas produced by a combustor that burns fuel, and a casing that is formed by connecting a plurality of casing members divided in plurality, the casing storing the rotor in an inside thereof, and including a second upper-side second vertical inner flange and a third upper-side first vertical inner flange for connecting a second upper casing member with a third upper casing member different from the second upper casing member among the casing members at the inside.

10 Claims, 10 Drawing Sheets

(56) References Cited

U.S. PATENT DOCUMENTS

| | | | |
|---|---|---|---|
| 5,259,725 A * | 11/1993 | Hemmelgarn et al. | 415/112 |
| 6,163,959 A | 12/2000 | Arraitz et al. | |
| 7,435,050 B2 | 10/2008 | Welch | |
| 2007/0160471 A1 | 7/2007 | Welch | |
| 2008/0240917 A1* | 10/2008 | Eleftheriou et al. | 415/213.1 |
| 2008/0310949 A1 | 12/2008 | Kondo et al. | |

FOREIGN PATENT DOCUMENTS

| | | | |
|---|---|---|---|
| JP | 2005061273 A | 3/2005 | |
| JP | 2006037855 A | 2/2006 | |
| JP | 2007187151 A | 7/2007 | |

OTHER PUBLICATIONS

International Search Report for PCT/JP2009/051277, mailed Mar. 17, 2009.

A KR Office Action, dated Jun. 29, 2012, in KR Application No. KR 2010-7019075.

Japanese Notice of Allowance for Application No. 2010-500615 mailed Oct. 30, 2012 with partial English translation.

Office Action mailed May 15, 2013 corresponding to Chinese patent application No. 200980105624.7.

* cited by examiner

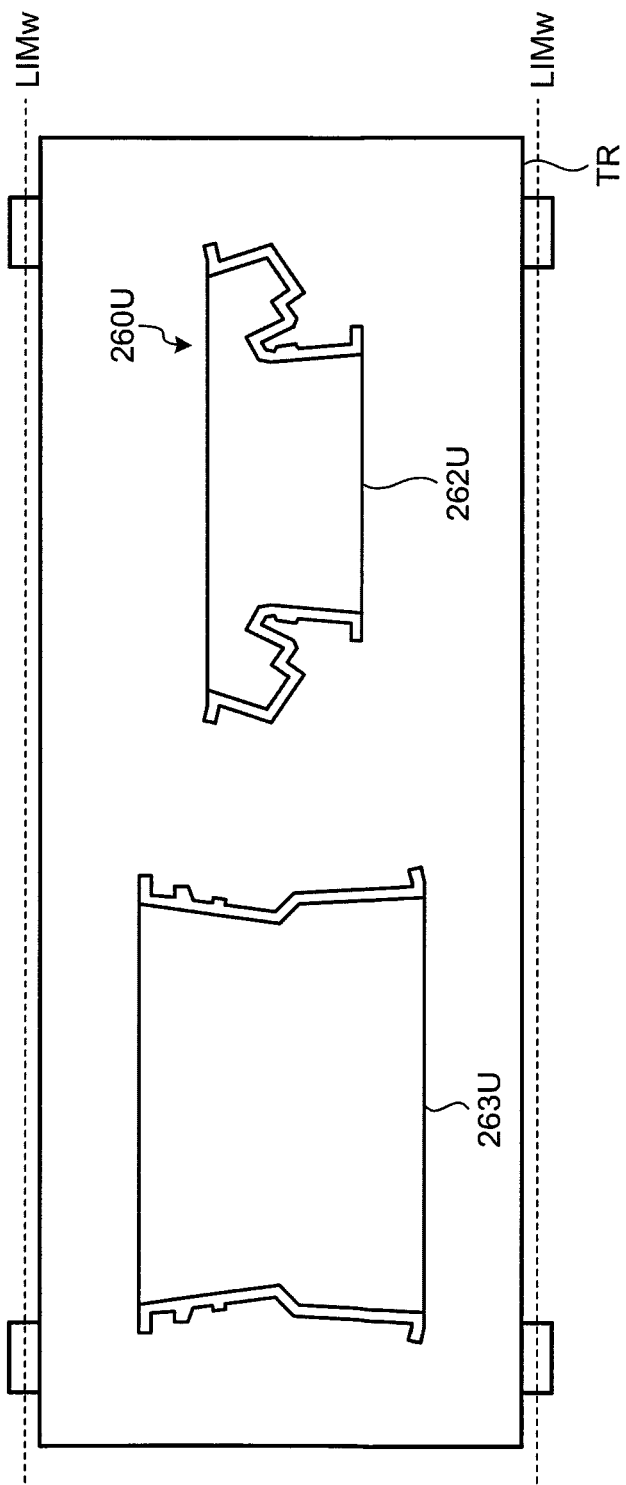

GAS TURBINE AND METHOD FOR OPENING CHAMBER OF GAS TURBINE

RELATED APPLICATIONS

The present application is a national phase of PCT/JP2009/051277 filed Jan. 27, 2009, and claims priority from Japanese Application Number 2008-048250, filed Feb. 28, 2008, the disclosures of which are hereby incorporated by reference herein in their entirety.

TECHNICAL FIELD

The present invention relates to a gas turbine and a method for opening a chamber of a gas turbine.

BACKGROUND ART

A gas turbine is used as an apparatus that extracts energy from combustion gas obtained by burning fuel. A gas turbine rotates a turbine by using energy of combustion gas produced by burning fuel, and outputs rotation energy from a rotor.

For example, Patent document 1 discloses a technology for preventing thermal deformation of a chamber casing, by mounting a valve for supplying external air to the inside of an upper chamber casing, and by introducing the external air into the inside of the chamber casing from the upper chamber casing to cool the upper chamber casing while the operation performed by the gas turbine is stopped.

[Patent document 1] Japanese Patent Application Laid-open No. 2006-37855

DISCLOSURE OF INVENTION

Problem to be Solved by the Invention

In the technology disclosed in Patent document 1, as illustrated in FIG. 2 in Patent document 1, the chamber casing is divided by a combusting unit chamber and connected by a flange. The combusting unit chamber is a chamber in which relatively high pressure fluid is present among the chambers formed in the gas turbine. Accordingly, in the technology disclosed in Patent document 1, the force applied to a divided part of the casing is not reduced. Consequently, for example, the size of the flange provided at the divided part is increased, thereby increasing the size of the casing.

The present invention has been made in view of the above circumstances, and an object of the present invention is to reduce the size of the casing at a divided part of the casing.

Means for Solving Problem

According to an aspect of the present invention, a gas turbine includes: a rotator rotated by combustion gas produced by a combustor that burns fuel; and a casing that is formed by connecting a plurality of casing members divided in plurality, the casing storing the rotator in an inside thereof, and including an inner connection portion for connecting a first casing member with a second casing member different from the first casing member among the casing members at the inside.

With the structure described above, in the gas turbine according to the present invention, the inner connection portion as a connection portion is also provided inside the casing. Accordingly, even if the size of an outer connection portion formed outside the casing is reduced, the connection portion of the first casing member and the second casing member has the strength to withstand the pressure of the fluid inside the casing.

In the gas turbine, the size of the outer connection portion formed outside the casing is reduced, because of the inner connection portion formed inside the casing. In this manner, in the gas turbine, the size in the radial direction of the casing is reduced at the connection portion of the first casing member and the second casing member. Accordingly, upon transporting the gas turbine, the risk that the connection portion of the first casing member and the second casing member does not fall within the maximum transport range is reduced.

Advantageously, in the gas turbine, the inner connection portion includes a first inner connection portion formed on the first casing member and projected in a direction toward a rotational axis of the rotator and a second inner connection portion formed on the second casing member and projected in the direction toward the rotational axis of the rotator, and the first inner connection portion and the second inner connection portion are connected by a connection member.

With the structure described above, in the gas turbine according to the present invention, the first inner connection portion and the second inner connection portion are connected by, for example, a bolt as the connection member. Accordingly, even if the size of the outer connection portion formed outside the casing is reduced, the connection portion of the first casing member and the second casing member of the gas turbine has the strength to withstand the pressure of the fluid inside the casing as described above.

In the gas turbine, the size of the outer connection portion formed outside the casing is reduced, because of the inner connection portion formed inside the casing. In this manner, in the gas turbine, the size in the radial direction of the casing is reduced at the connection portion of the first casing member and the second casing member. Accordingly, upon transporting the gas turbine, the risk that the connection portion of the first casing member and the second casing member does not fall within the maximum transport range is reduced.

Advantageously, in the gas turbine, the first casing member and the second casing member are connected by the inner connection portion by welding.

With the structure described above, in the gas turbine according to the present invention, a gap between the connection portion formed on the first casing member and the connection portion formed on the second casing member is filled, thereby sealing a space in the casing more appropriately.

Advantageously, in the gas turbine, the inner connection portion is provided at a portion of a combusting unit chamber in which the combustor is disposed.

A relatively high pressure fluid is disposed in the combusting unit chamber, among the chambers of the gas turbine. Accordingly, the size of the connection portion provided at a portion of the combusting unit chamber tends to be increased to secure the strength of the connection portion. However, with the structure described above, in the connection portion of the first casing member and the second casing member of the gas turbine, as described above, the size of the outer connection portion formed outside the casing is reduced, because of the inner connection portion formed inside the casing.

In this manner, in the gas turbine, the size in the radial direction of the casing is reduced at the connection portion of the first casing member and the second casing member. Accordingly, upon transporting the gas turbine, the risk that the connection portion of the first casing member and the second casing member does not fall within the maximum transport range is reduced.

Advantageously, in the gas turbine, the casing is divided by a plane perpendicular to the rotational axis of the rotator, and the inner connection portion is provided at a divided part divided by the plane perpendicular to the rotational axis.

With the structure described above, in the connection portion provided at the divided part divided by the plane perpendicular to the rotational axis of the gas turbine, the size of the outer connection portion formed outside the casing is reduced, because of the inner connection portion formed inside the casing. In this manner, in the gas turbine, the size in the radial direction of the casing is reduced at the connection portion provided at the divided part divided by the plane perpendicular to the rotational axis. Accordingly, upon transporting the gas turbine, the risk that the connection portion of the first casing member and the second casing member does not fall within the maximum transport range is reduced.

Advantageously, in the gas turbine, the inner connection portion, in a connection portion of the first casing member and the second casing member, is provided inside the casing at a portion where an outer connection portion connected by a connection member at an outside opposite from the inside where the rotator is disposed is not disposed.

If the strength of the connection portion can be secured sufficiently, in the connection portion formed on the casing member of the gas turbine, the outer connection portion may not be provided at the portion where the inner connection portion is provided. In this manner, in the gas turbine, the size in the radial direction of the casing is further reduced at the connection portion formed on the casing members. Accordingly, upon transporting the gas turbine, the risk that the connection portion does not fall within the maximum transport range is further reduced.

Advantageously, in the gas turbine, the casing is divided into an upper casing member and a lower casing member by a plane including the rotational axis of the rotator, and the inner connection portion is not provided on the upper casing member, but only provided on the lower casing member.

In this manner, in the gas turbine, for example, the upper casing member can be easily removed during maintenance and inspection. Further, in the gas turbine, the size in the radial direction of the lower casing member can be further reduced at the connection portion formed on the lower casing member. Consequently, upon transporting the gas turbine, the risk that the connection portion formed on the lower casing member does not fall within the maximum transport range is further reduced.

Advantageously, in the gas turbine, the inner connection portion is circularly provided at an inside of a side periphery of the casing formed in a cylindrical shape along a circumferential direction over an entire periphery.

With the structure described above, in the gas turbine, the size of the casing in the radial direction is reduced at the connection portion circularly formed at the side periphery of the casing along the circumferential direction. Accordingly, upon transporting the gas turbine, the risk that the connection portion circularly formed at the side periphery of the casing along the circumferential direction does not fall within the maximum transport range can be further reduced.

Advantageously, in the gas turbine, at least one member of members of the casing is connected to a connection portion only provided outside the combusting unit chamber by a connection member.

With the structure described above, in the gas turbine according to the present invention, at least a part of the members that form the combusting unit chamber is removed from the outside of the combusting unit chamber. Accordingly, the member of the combusting unit chamber can be removed from the casing, for example, upon maintaining and inspecting the gas turbine.

Advantageously, the gas turbine further includes an intermediate shaft cover that includes a portion fitted into the casing, that is supported inside the combusting unit chamber, and that supports the combustor.

With the structure described above, the intermediate shaft cover of the gas turbine according to the present invention has a portion fitted into the casing, and is not completely fixed to the casing by, for example, a bolt. Accordingly, even if a worker does not go into the combusting unit chamber to access the connection portion of the casing and the intermediate shaft cover, the casing can be removed upon, for example, maintaining and inspecting the gas turbine.

In this manner, in the gas turbine, the number of working steps required for maintaining and inspecting the gas turbine can be reduced, by providing the intermediate shaft cover having the portion fitted into the casing. Accordingly, the labor power of the worker required for maintaining and inspecting the gas turbine can be reduced. The work hour required for maintaining and inspecting the gas turbine can be also reduced.

According to another aspect of the present invention, a method for opening a chamber of a gas turbine that includes a rotator rotated by combustion gas produced by a combustor that burns fuel, and a casing that is formed by connecting a plurality of casing members divided in plurality, the casing storing the rotator in an inside thereof, and including an inner connection portion for connecting a first casing member with a second casing member different from the first casing member among the casing members at the inside, wherein the inner connection portion is provided on a portion of a combusting unit chamber in which the combustor is disposed, and at least one member of members of the casing is connected to a connection portion only provided outside the combusting unit chamber by a connection member, the method includes removing at least one member of members of the combusting unit chamber in which the combustor is disposed, from outside the combusting unit chamber.

With the structure described above, by using the method for opening the chamber of the gas turbine according to the present invention, at least one member of the members of the combusting unit chamber is removed from the outside of the combusting unit chamber. Accordingly, for example, during maintenance and inspection, the chamber of the gas turbine can be opened by removing at least one member of the members of the combusting unit chamber from the outside of the combusting unit chamber.

Advantageously, in the method for opening the chamber of the gas turbine, at least one member of the members of the combusting unit chamber is removed from outside the combusting unit chamber, without removing an intermediate shaft cover that includes a portion fitted into the casing, that is supported inside the combusting unit chamber, and that supports the combustor.

With the structure described above, by using the method for opening the chamber of the gas turbine according to the present invention, the intermediate shaft cover is only fitted into the casing, and is not fixed to the casing by, for example, a bolt. In this manner, for example, a worker does not need to go into the combusting unit chamber during maintenance and inspection to access the connection portion of the casing and the intermediate shaft cover. Accordingly, for example, even if the intermediate shaft cover is not removed during maintenance and inspection, the chamber of the gas turbine can be opened by simply removing the casing.

Effect of the Invention

The present invention can reduce the size of a casing at a divided part of the casing.

BRIEF DESCRIPTION OF DRAWINGS

FIG. 10 is a schematic for explaining a method of transporting an upper casing member according to the second embodiment.

BEST MODE(S) FOR CARRYING OUT THE INVENTION

The present invention will now be described in detail with reference to the drawings. The present invention is not limited to the best modes (hereinafter, embodiments) for carrying out the invention. Constituent elements according to the embodiments below include elements that can be easily assumed by a person skilled in the art, elements being substantially the same as those elements, and elements that fall within a range of so-called equivalents.

First Embodiment

Figure 1:
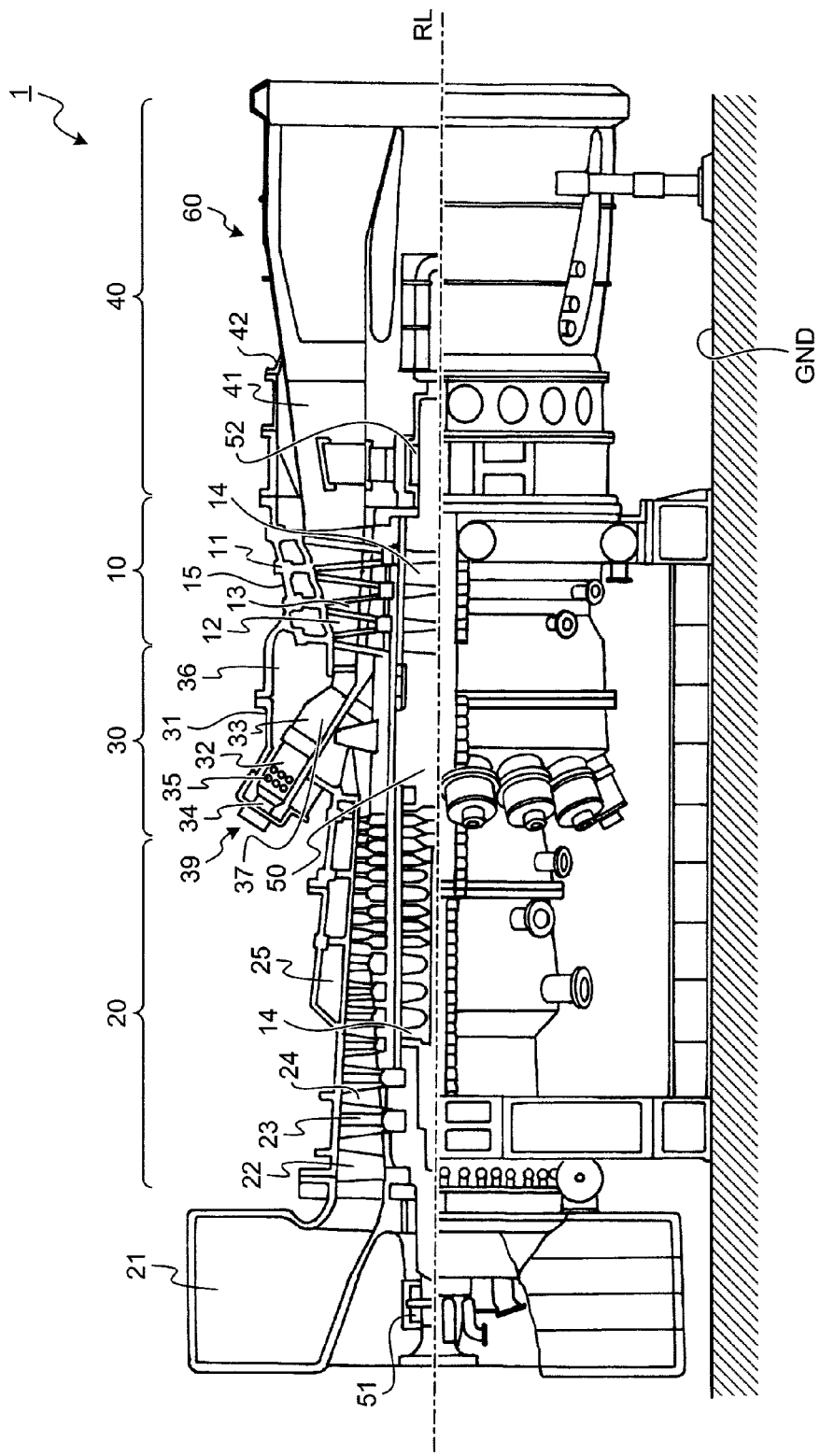
FIG. 1 is a schematic of a gas turbine according to a first embodiment.

FIG. 1 is a schematic of a gas turbine according to a first embodiment. A gas turbine 1 according to the present embodiment, as illustrated in FIG. 1, includes a compressor 20, a combusting unit 30, a turbine 10, and an exhausting unit 40 arranged in this order from the upstream side to the downstream side of the flow of fluid.

The compressor 20 compresses air and delivers the compressed air to the combusting unit 30. The combusting unit 30 supplies fuel to the compressed air. The combusting unit 30 then burns the fuel. The turbine 10 converts energy of combustion gas delivered from the combusting unit 30 into rotation energy. The exhausting unit 40 exhausts the combustion gas to the atmosphere.

The compressor 20 includes an air inlet port 21, a compressor casing 22, a compressor vane 23, a compressor rotor blade 24, and a bleed air manifold 25. Air is drawn into the compressor casing 22 from the atmosphere through the air inlet port 21.

A plurality of such compressor vanes 23 and a plurality of such compressor rotor blades 24 are alternately arranged in the compressor casing 22. The bleed air manifold 25 is provided outside the compressor vanes 23 and the compressor rotor blades 24, and guides the air compressed by the compressor 20 to the combusting unit 30.

The combusting unit 30 includes a combusting unit casing 31 and a combustor 39. A combusting unit chamber 36 is formed inside the combusting unit casing 31. The combustor 39 includes a combustor liner 32, a transition piece 33, a fuel nozzle 34, and a combustor liner air inlet port 35. The combustor liner 32 is formed substantially in a cylindrical shape, and provided inside the combusting unit chamber 36 as a passage for compressed air. In addition, the combusting unit chamber 36 includes the transition piece 33 as a passage for compressed air. The transition piece 33 is formed in a cylindrical shape, and a combustion region 37 where fuel is burned is formed inside the transition piece 33.

The transition piece 33 is connected to one of the ends of the combustor liner 32 in the axial direction. The fuel nozzle 34 for ejecting fuel into the combustor liner 32 is provided to the other end of the combustor liner 32 that is opposite from the end to which the transition piece 33 is provided. A plurality of combustor liner air inlet ports 35 that introduces the compressed air into the combustor liner 32 is provided at the outer peripheral surface of the combustor liner 32.

The fuel is ejected from the fuel nozzle 34 to the compressed air introduced inside the combustor liner 32 through the combustor liner air inlet ports 35, and guided to the combustion region 37 in the transition piece 33. The fuel introduced into the combustion region 37 is ignited by a burner, and converted into combustion gas with kinetic energy, by being burned.

The turbine 10 has a turbine casing 15 including a turbine chamber 11, a turbine nozzle 12, and a turbine rotor blade 13. A plurality of such turbine nozzles 12 and a plurality of such turbine rotor blades 13 are alternately arranged in the turbine chamber 11. The exhausting unit 40 has an exhausting unit casing 42 including an exhaust diffuser 41. The exhaust diffuser 41 is connected to the turbine 10, and converts dynamic pressure of the combustion gas that has passed through the turbine 10, in other words, exhaust gas, into static pressure.

The gas turbine 1 includes a rotor 50 as a rotator. The rotor 50 is provided so as to penetrate through the center portions of the compressor 20, the combusting unit 30, the turbine 10, and the exhausting unit 40. An end of the rotor 50 at the side of the compressor 20 is rotatably supported by a bearing 51, and an end of the rotor 50 at the side of the exhausting unit 40 is rotatably supported by a bearing 52.

The rotor 50 is provided inside a casing 60, and rotates about a rotational axis RL. The rotor 50 includes a plurality of disks 14. The disks 14 are connected to the compressor rotor blades 24 and the turbine rotor blades 13. A driving shaft of a generator, which is not illustrated, is connected to the end of the rotor 50 at the side of the compressor 20.

With the structure described above, the air drawn in from the air inlet port 21 of the compressor 20 is turned into high-temperature and high-pressure compressed air, by being compressed by the compressor vanes 23 and the compressor rotor blades 24. The combusting unit 30 then supplies a predetermined fuel to the compressed air, thereby burning the fuel.

The energy of the high-temperature and high-pressure combustion gas that is working fluid produced in the combusting unit 30 is converted into rotation energy as it passes through the turbine nozzles 12 and the turbine rotor blades 13 of the turbine 10. The rotation energy is transmitted to the rotor 50 through the turbine rotor blades 13, thereby rotating the rotor 50. In this manner, the gas turbine 1 drives the generator connected to the rotor 50. The dynamic pressure of the exhaust gas that has passed through the turbine 10 is converted into static pressure by the exhaust diffuser 41 of the exhausting unit 40, and then the exhaust gas is released to the atmosphere.

Figure 2:
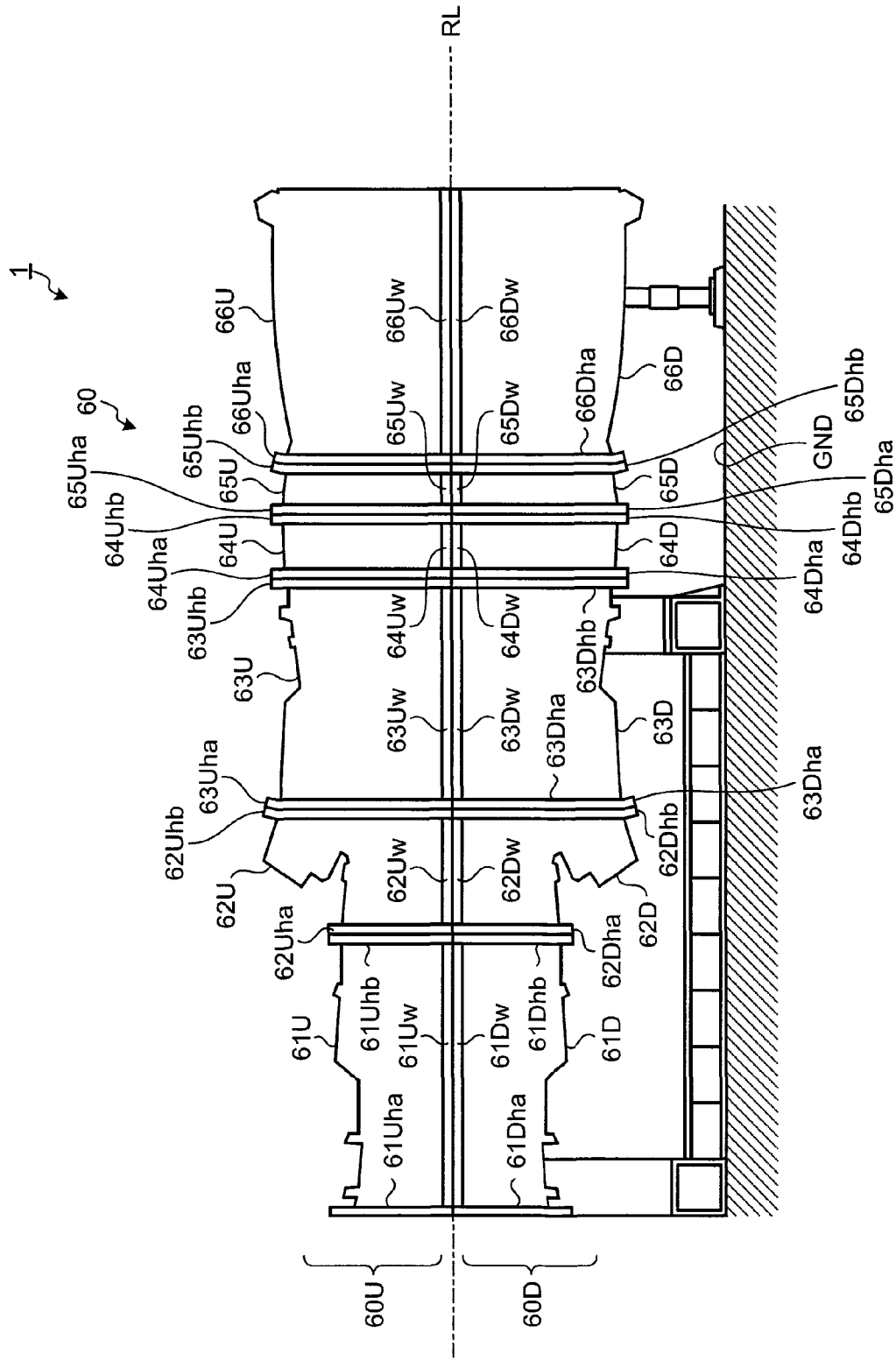
FIG. 2 is a schematic sectional view of a casing of the gas turbine according to the first embodiment.

FIG. 2 is a schematic sectional view of the casing of the gas turbine according to the first embodiment. The feature of the gas turbine 1 lies in the structure of the casing 60. The casing 60 is dividedly formed as illustrated in FIG. 2, because of the limitation in the size of a machine tool used for manufacturing the casing 60 and the transportable size of the casing 60.

The casing 60 is divided by a plane including the rotational axis RL of the rotor 50 illustrated in FIG. 1. In the gas turbine 1 in an installed state, the casing 60 at the side of a ground GND is a lower casing member 60D, and the casing 60 at the side farther from the ground GND than the lower casing member 60D is an upper casing member 60U.

The casing 60 is divided by a plane perpendicular to the rotational axis RL and, for example, divided parts are provided at five locations. In this manner, the casing 60 is divided into six portions by the planes perpendicular to the rotational axis RL. Accordingly, because the casing 60 is also divided by the plane including the rotational axis RL, the casing 60 is divided into 12 casing members in total.

The upper casing member 60U includes a first upper casing member 61U, a second upper casing member 62U, a third upper casing member 63U, a fourth upper casing member 64U, a fifth upper casing member 65U, and a sixth upper casing member 66U, arranged in this order from the upstream side of the flow of air or combustion gas that flows inside the gas turbine 1.

The lower casing member 60D includes a first lower casing member 61D, a second lower casing member 62D, a third lower casing member 63D, a fourth lower casing member 64D, a fifth lower casing member 65D, and a sixth lower casing member 66D, arranged in this order from the upstream side of the flow of air or combustion gas that flows inside the gas turbine 1. The air or combustion gas is simply referred to as fluid below.

The members of the casing 60 divided into 12 pieces in this manner, are joined together by connecting flanges that are connection members formed on the members. A flange formed at a part divided by the plane including the rotational axis RL is called a horizontal flange. In other words, the horizontal flange is formed in the direction along the rotational axis RL.

The first upper casing member 61U includes a first upper-side horizontal flange 61Uw. The first lower casing member 61D includes a first lower-side horizontal flange 61Dw. The first upper casing member 61U and the first lower casing member 61D are brought into close contact with each other without a gap, by the first upper-side horizontal flange 61Uw and the first lower-side horizontal flange 61Dw.

The second upper casing member 62U includes a second upper-side horizontal flange 62Uw. The second lower casing member 62D includes a second lower-side horizontal flange 62Dw. The second upper casing member 62U and the second lower casing member 62D are brought into close contact with each other without a gap, by the second upper-side horizontal flange 62Uw and the second lower-side horizontal flange 62Dw.

The third upper casing member 63U includes a third upper-side horizontal flange 63Uw. The third lower casing member 63D includes a third lower-side horizontal flange 63Dw. The third upper casing member 63U and the third lower casing member 63D are brought into close contact with each other without a gap, by the third upper-side horizontal flange 63Uw and the third lower-side horizontal flange 63Dw.

The fourth upper casing member 64U includes a fourth upper-side horizontal flange 64Uw. The fourth lower casing member 64D includes a fourth lower-side horizontal flange 64Dw. The fourth upper casing member 64U and the fourth lower casing member 64D are brought into close contact with each other without a gap, by the fourth upper-side horizontal flange 64Uw and the fourth lower-side horizontal flange 64Dw.

The fifth upper casing member 65U includes a fifth upper-side horizontal flange 65Uw. The fifth lower casing member 65D includes a fifth lower-side horizontal flange 65Dw. The fifth upper casing member 65U and the fifth lower casing member 65D are brought into close contact with each other without a gap, by the fifth upper-side horizontal flange 65Uw and the fifth lower-side horizontal flange 65Dw.

The sixth upper casing member 66U includes a sixth upper-side horizontal flange 66Uw. The sixth lower casing member 66D includes a sixth lower-side horizontal flange 66Dw. The sixth upper casing member 66U and the sixth lower casing member 66D are brought into close contact with each other without a gap, by the sixth upper-side horizontal flange 66Uw and the sixth lower-side horizontal flange 66Dw.

A flange formed at a part divided by the plane perpendicular to the rotational axis RL is called a vertical flange. The vertical flange is formed along the side periphery of the casing 60 in the circumferential direction. The first upper casing member 61U includes a first upper-side first vertical flange 61Uha and a first upper-side second vertical flange 61Uhb. The second upper casing member 62U includes a second upper-side first vertical flange 62Uha and a second upper-side second vertical flange 62Uhb.

In the first upper casing member 61U, the first upper-side first vertical flange 61Uha is connected to an opening of the air inlet port 21. The first upper casing member 61U and the second upper casing member 62U are brought into close contact with each other without a gap, by the first upper-side second vertical flange 61Uhb and the second upper-side first vertical flange 62Uha.

The third upper casing member 63U includes a third upper-side first vertical flange 63Uha and a third upper-side second vertical flange 63Uhb. The second upper casing member 62U and the third upper casing member 63U are brought into close contact with each other without a gap, by the second upper-side second vertical flange 62Uhb and the third upper-side first vertical flange 63Uha.

The fourth upper casing member 64U includes a fourth upper-side first vertical flange 64Uha and a fourth upper-side second vertical flange 64Uhb. The second upper casing member 63U and the third upper casing member 64U are brought into close contact with each other without a gap, by the third upper-side second vertical flange 63Uhb and the fourth upper-side first vertical flange 64Uha.

The fifth upper casing member 65U includes a fifth upper-side first vertical flange 65Uha and a fifth upper-side second vertical flange 65Uhb. The fourth upper casing member 64U and the fifth upper casing member 65U are brought into close contact with each other without a gap, by the fourth upper-side second vertical flange 64Uhb and the fifth upper-side first vertical flange 65Uha.

The sixth upper casing member 66U includes a sixth upper-side first vertical flange 66Uha. The fifth upper casing member 65U and the sixth upper casing member 66U are brought into close contact with each other without a gap, by the fifth upper-side second vertical flange 65Uhb and the sixth upper-side first vertical flange 66Uha.

The first lower casing member 61D includes a first lower-side first vertical flange 61Dha and a first lower-side second vertical flange 61Dhb. The second lower casing member 62D includes a second lower-side first vertical flange 62Dha and a second lower-side second vertical flange 62Dhb.

In the first lower casing member 61D, the first lower-side first vertical flange 61Dha is connected to the opening of the air inlet port 21. The first lower casing member 61D and the second lower casing member 62D are brought into close contact with each other without a gap, by the first lower-side second vertical flange 61Dhb and the second lower-side first vertical flange 62Dha.

The third lower casing member 63D includes a third lower-side first vertical flange 63Dha and a third lower-side second vertical flange 63Dhb. The second lower casing member 62D and the third lower casing member 63D are brought into close contact with each other without a gap, by the second lower-side second vertical flange 62Dhb and the third lower-side first vertical flange 63Dha.

The fourth lower casing member 64D includes a fourth lower-side first vertical flange 64Dha and a fourth lower-side second vertical flange 64Dhb. The third lower casing member 63D and the fourth lower casing member 64D are brought into close contact with each other without a gap, by the third lower-side second vertical flange 63Dhb and the fourth lower-side first vertical flange 64Dha.

The fifth lower casing member 65D includes a fifth lower-side first vertical flange 65Dha and a fifth lower-side second vertical flange 65Dhb. The fourth lower casing member 64D and the fifth lower casing member 65D are brought into close contact with each other without a gap, by the fourth lower-side second vertical flange 64Dhb and the fifth lower-side first vertical flange 65Dha.

The sixth lower casing member 66D includes a sixth lower-side first vertical flange 66Dha. The fifth lower casing member 65D and the sixth lower casing member 66D are brought into close contact with each other without a gap, by the fifth lower-side second vertical flange 65Dhb and the sixth lower-side first vertical flange 66Dha.

As described above, in the casing 60, the first upper casing member 61U, the second upper casing member 62U, the third upper casing member 63U, the fourth upper casing member 64U, the fifth upper casing member 65U, the sixth upper casing member 66U, the first lower casing member 61D, the second lower casing member 62D, the third lower casing member 63D, the fourth lower casing member 64D, the fifth lower casing member 65D, and the sixth lower casing member 66D are joined together.

Figure 3:
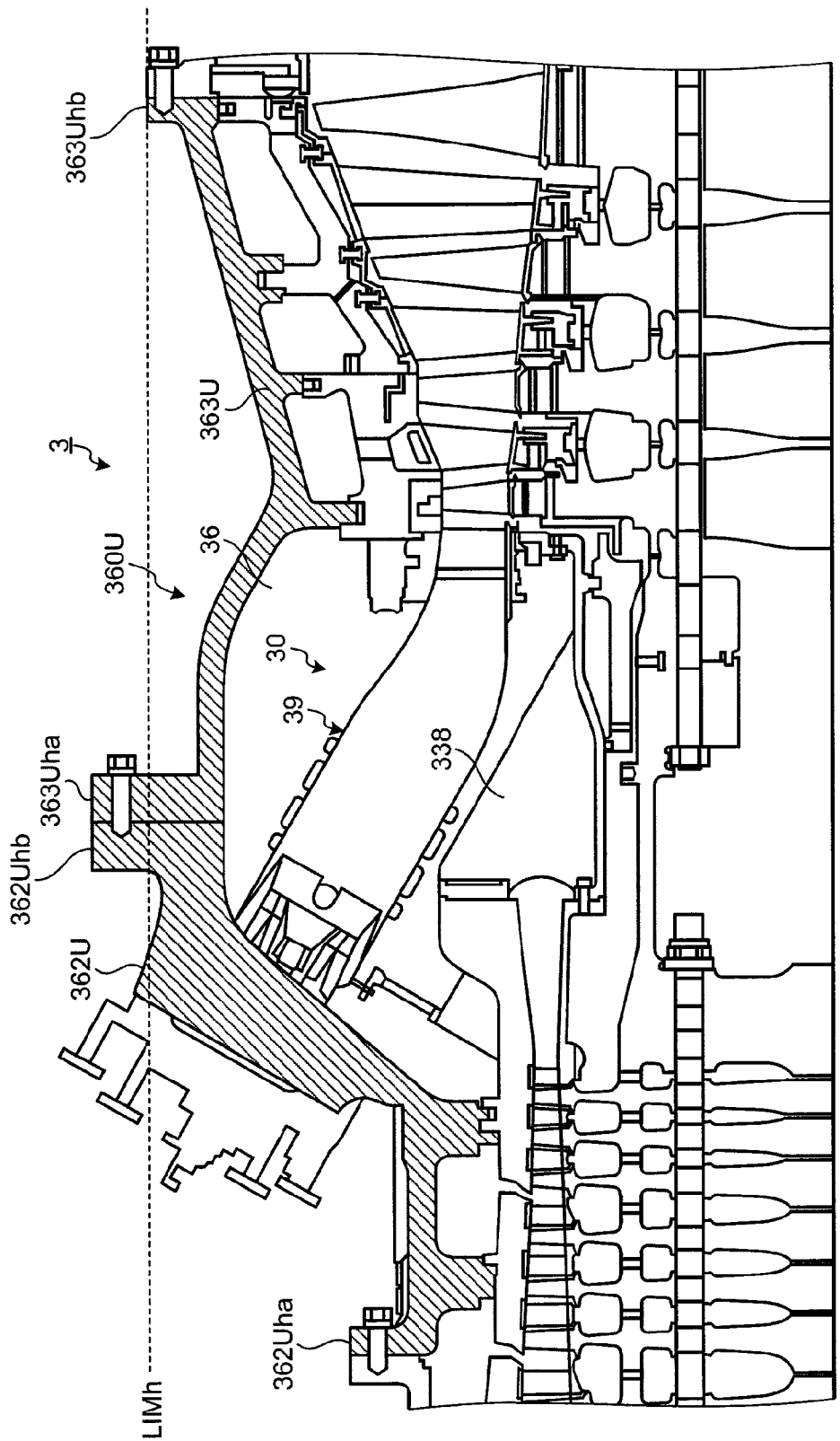
FIG. 3 is an enlarged sectional view of a conventional second upper-side second vertical flange and a third upper-side second vertical flange.

FIG. 3 is an enlarged sectional view of a conventional second upper-side second vertical flange and a third upper-side second vertical flange. An upper casing member 360U of a conventional gas turbine 3 includes a second upper casing member 362U and a third upper casing member 363U. The second upper casing member 362U includes a second upper-side first vertical flange 362Uha and a second upper-side second vertical flange 362Uhb. The third upper casing member 363U includes a third upper-side first vertical flange 363Uha and a third upper-side second vertical flange 363Uhb.

The size of the gas turbine is limited, if the gas turbine is transported by a transport vehicle. The maximum transport height LIMh illustrated in FIG. 3, is the maximum height of the gas turbine that can be transported by the transport vehicle. The height, for example, is the distance in the vertical direction from, for example, the ground. The transport vehicle is capable of transporting a member with the height equal to or less than the maximum transport height LIMh, on the load-carrying platform.

As illustrated in FIG. 3, the second upper casing member 362U and the third upper casing member 363U store therein the combusting unit chamber 36. Relatively high pressure fluid is present in the combusting unit chamber 36, among the chambers of the gas turbine 3. Accordingly, to secure the strength of the connection portion of the second upper casing member 362U and the third upper casing member 363U, the second upper-side second vertical flange 362Uhb and the third upper-side first vertical flange 363Uha may be increased in size. In such a case, in the gas turbine 3, as illustrated in FIG. 3, the second upper-side second vertical flange 362Uhb and the third upper-side first vertical flange 363Uha may not fall within the range of the maximum transport height LIMh.

Figure 4:
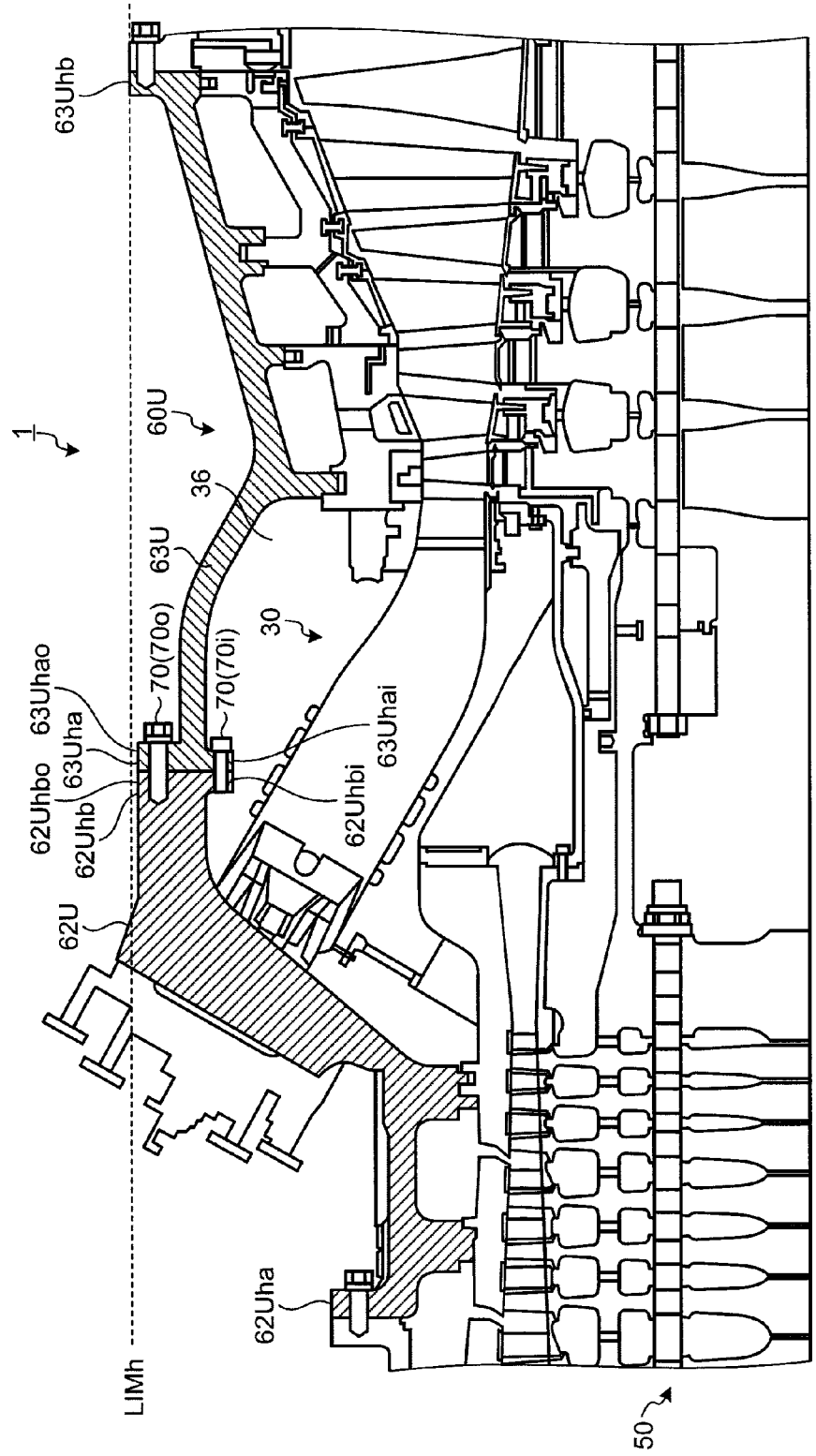
FIG. 4 is an enlarged sectional view of a second upper-side second vertical flange and a third upper-side second vertical flange according to the first embodiment.

FIG. 4 is an enlarged sectional view of a second upper-side second vertical flange and a third upper-side second vertical flange according to the first embodiment. In the second upper casing member 62U and the third upper casing member 63U of the gas turbine 1, the second upper-side second vertical flange 62Uhb and the third upper-side first vertical flange 63Uha are connected by bolts 70, at the outside of the combusting unit chamber 36 and at the inside of the combusting unit chamber 36.

In general, the flange is formed outside the combusting unit chamber 36 and projected toward the outside in the radial direction of the rotor 50. The second upper-side second vertical flange 62Uhb includes a second upper-side second vertical outer flange 62Uhbo as an outer connection portion formed outside the combusting unit chamber 36 and projected toward the outside in the radial direction of the rotor 50, and a second upper-side second vertical inner flange 62Uhbi as an inner connection portion formed inside the combusting unit chamber 36 and projected toward the inside in the radial direction of the rotor 50.

The third upper-side first vertical flange 63Uha includes a third upper-side first vertical outer flange 63Uhao as an outer connection portion formed outside the combusting unit chamber 36 and projected toward the outside in the radial direction of the rotor 50, and a third upper-side first vertical inner flange 63Uhai as an inner connection portion formed inside the combusting unit chamber 36 and projected toward the inside in the radial direction of the rotor 50.

The second upper-side second vertical outer flange 62Uhbo is connected to the third upper-side first vertical outer flange 63Uhao by an outer bolt 70o. The second upper-side second vertical inner flange 62Uhbi is connected to the third upper-side first vertical inner flange 63Uhai by an inner bolt 70i.

The second upper-side second vertical inner flange 62Uhbi and the third upper-side first vertical inner flange 63Uhai may be connected by welding in addition to the connection by the inner bolt 70i. In such a case, in the gas turbine 1, the gap between the second upper-side second vertical inner flange 62Uhbi and the third upper-side first vertical inner flange 63Uhai is filled, thereby sealing the combusting unit chamber 36 more appropriately. Similar to the connection portion of the second upper casing member 62U and the third upper casing member 63U, the connection portion of the second lower casing member 62D and the third lower casing member 63D is also connected both at inside and outside of the combusting unit chamber 36.

In the casing 60, the second lower casing member 62D and the third lower casing member 63D are connected both at inside and outside. Then, in the casing 60, the second upper casing member 62U and the third upper casing member 63U are also connected both at inside and outside. In the casing 60, the integrated second lower casing member 62D and the third lower casing member 63D, and the integrated second upper casing member 62U and the third upper casing member 63U are connected. More specifically, in the casing 60, as illustrated in FIG. 2, the second upper-side horizontal flange 62Uw and the second lower-side horizontal flange 62Dw are connected, and the third upper-side horizontal flange 63Uw and the third lower-side horizontal flange 63Dw are connected.

In this manner, in the gas turbine 1, the second upper-side second vertical inner flange 62Uhbi and the third upper-side first vertical inner flange 63Uhai are also included in the combusting unit chamber 36 as connection members. Accordingly, the connection portion of the second upper casing member 62U and the third upper casing member 63U has the strength to withstand the pressure of the fluid inside the combusting unit chamber 36.

In the gas turbine 1, the size in the radial direction of the casing 60 is reduced at the connection portion of the second upper-side second vertical flange 62Uhb and the third upper-side first vertical flange 63Uha. Therefore, upon transporting the gas turbine 1, the risk that the connection portion of the second upper-side second vertical flange 62Uhb and the third upper-side first vertical flange 63Uha does not fall within the range of the maximum transport height LIMh is reduced.

Figure 5:
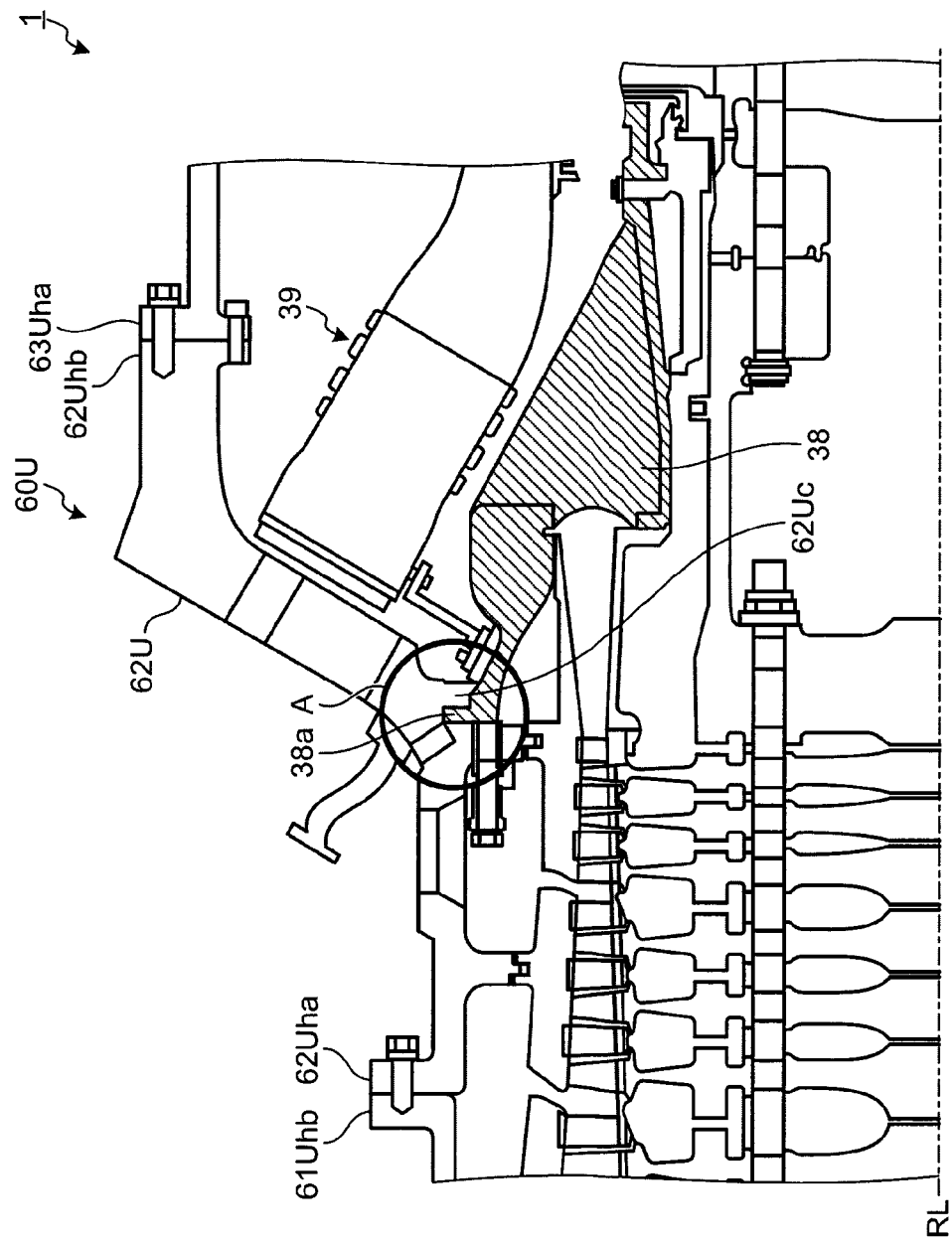
FIG. 5 is an enlarged schematic sectional view of an intermediate shaft cover at the side of an upper casing member according to the first embodiment.
Figure 6:
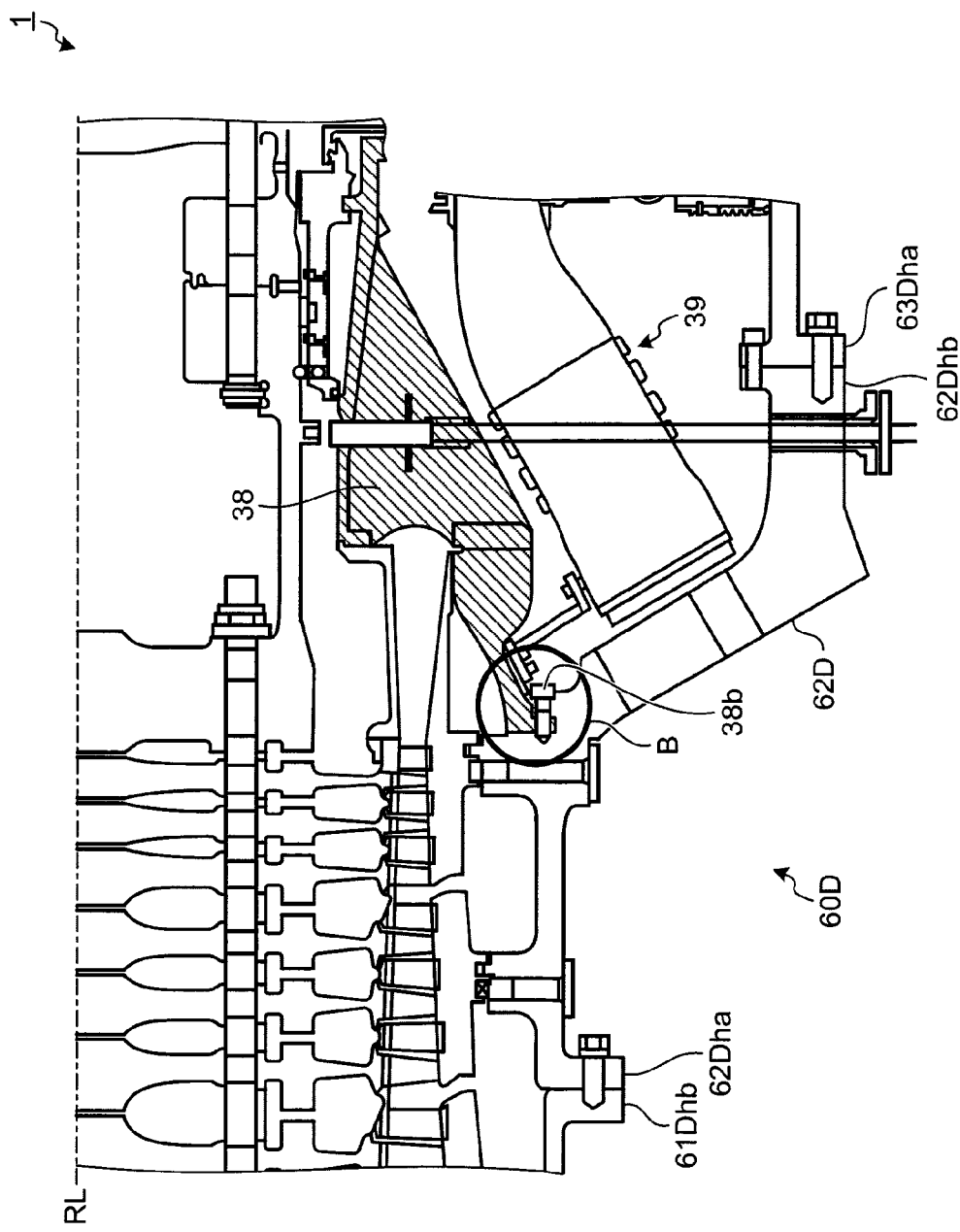
FIG. 6 is an enlarged schematic sectional view of an intermediate shaft cover at the side of a lower casing member according to the first embodiment.

FIG. 5 is an enlarged schematic sectional view of an intermediate shaft cover at the side of an upper casing member according to the first embodiment. FIG. 6 is an enlarged schematic sectional view of an intermediate shaft cover at the side of a lower casing member according to the first embodiment.

As illustrated in FIG. 5, the combustor 39 of the combusting unit 30 is supported by an intermediate shaft cover 38. An intermediate shaft cover 338 of the conventional gas turbine 3 illustrated in FIG. 3 is fixed to a second upper casing member 362U by, for example, a bolt. On the other hand, the intermediate shaft cover 38 illustrated in FIG. 5 is not fixed to the second upper casing member 62U of the upper casing member 60U by a bolt. In the intermediate shaft cover 38, as illustrated in a portion A in FIG. 5, an intermediate shaft cover side fitting portion 38a formed on the intermediate shaft cover 38, and a second member side fitting portion 62Uc formed on the second upper casing member 62U are fitted with each other.

As illustrated in a portion B in FIG. 6, the intermediate shaft cover 38 is fixed to the second lower casing member 62D of the lower casing member 60D by a bolt 38b. The upper casing member 60U illustrated in FIG. 5 is removed upon maintaining and inspecting the gas turbine 1, but the lower casing member 60D illustrated in FIG. 6 is not removed during maintenance and inspection of the gas turbine 1. Accordingly, the intermediate shaft cover 38 is sufficiently fixed to the second lower casing member 62D of the lower casing member 60D, which will not be removed during maintenance and inspection, by the bolt 38b, and fitted to the upper casing member 60U, which will be removed during maintenance and inspection, by the intermediate shaft cover side fitting portion 38a and the second member side fitting portion 62Uc.

Upon maintaining and inspecting the gas turbine 3 illustrated in FIG. 3, the third upper casing member 363U is removed at first. A worker then goes into the combusting unit chamber 36 and removes the bolt at the connection portion of the second upper casing member 362U and the intermediate shaft cover 338. In the gas turbine 3, the second upper casing member 362U is then removed. Accordingly, upon maintaining and inspecting the gas turbine 3, the combustor 39 is exposed.

Upon maintaining and inspecting the gas turbine 1 illustrated in FIGS. 4, 5, and 6, the second upper casing member 62U of the upper casing member 60U illustrated in FIG. 5 is removed at first. At this time, the intermediate shaft cover 38 is only fitted into the second upper casing member 62U of the upper casing member 60U, and not fixed to the second upper casing member 62U of the upper casing member 60U by a bolt.

Accordingly, in the gas turbine 1, the worker does not need to go into the combusting unit chamber 36 to access the connection portion of the second upper casing member 62U and the intermediate shaft cover 38. Consequently, upon maintaining and inspecting the gas turbine 1, the combustor 39 is exposed only by removing the second upper casing member 62U of the upper casing member 60U.

In this manner, in the gas turbine 1, the number of working steps required for maintaining and inspecting the gas turbine 1 can be reduced with the intermediate shaft cover 38 fitted into the upper casing member 60U. Accordingly, the labor power of the worker required during maintenance and inspection of the gas turbine 1 is reduced. The work hour required for maintaining and inspecting the gas turbine 1 is also reduced.

The intermediate shaft cover 38 is not limited to a fitting type fitted into the upper casing member 60U. For example, the intermediate shaft cover 38 may be fixed to the second upper casing member 62U by a bolt. In this case, the bolt that connects the intermediate shaft cover 38 and the second upper casing member 62U is exposed outside the combusting unit chamber 36.

In this manner, the worker can remove the second upper casing member 62U from the intermediate shaft cover 38, by removing the bolt at the outside of the combusting unit chamber 36 without going into the combusting unit chamber 36 to access the connection portion of the second upper casing member 62U and the intermediate shaft cover 38.

In the gas turbine 1, an opening enabling a worker to access inside the combusting unit chamber 36 may be provided, at least on one of the second upper casing member 62U and the second lower casing member 62D. A lid member for blocking the opening is provided at the opening. The lid member is connected to the casing 60 only at the outside of the combusting unit chamber 36, by a bolt as a connection member.

In this case also, the intermediate shaft cover 38 may be fixed to the second upper casing member 62U by a bolt. A worker removes the bolt fixing the lid member to the casing 60 at the outside of the combusting unit chamber 36 at first. The worker then goes into the combusting unit chamber 36 and removes the bolt at a connection portion of the second upper casing member 62U and the intermediate shaft cover 38. In this manner, in the gas turbine 1, the second upper casing member 62U is removed from the intermediate shaft cover 38.

Second Embodiment

Figure 7:
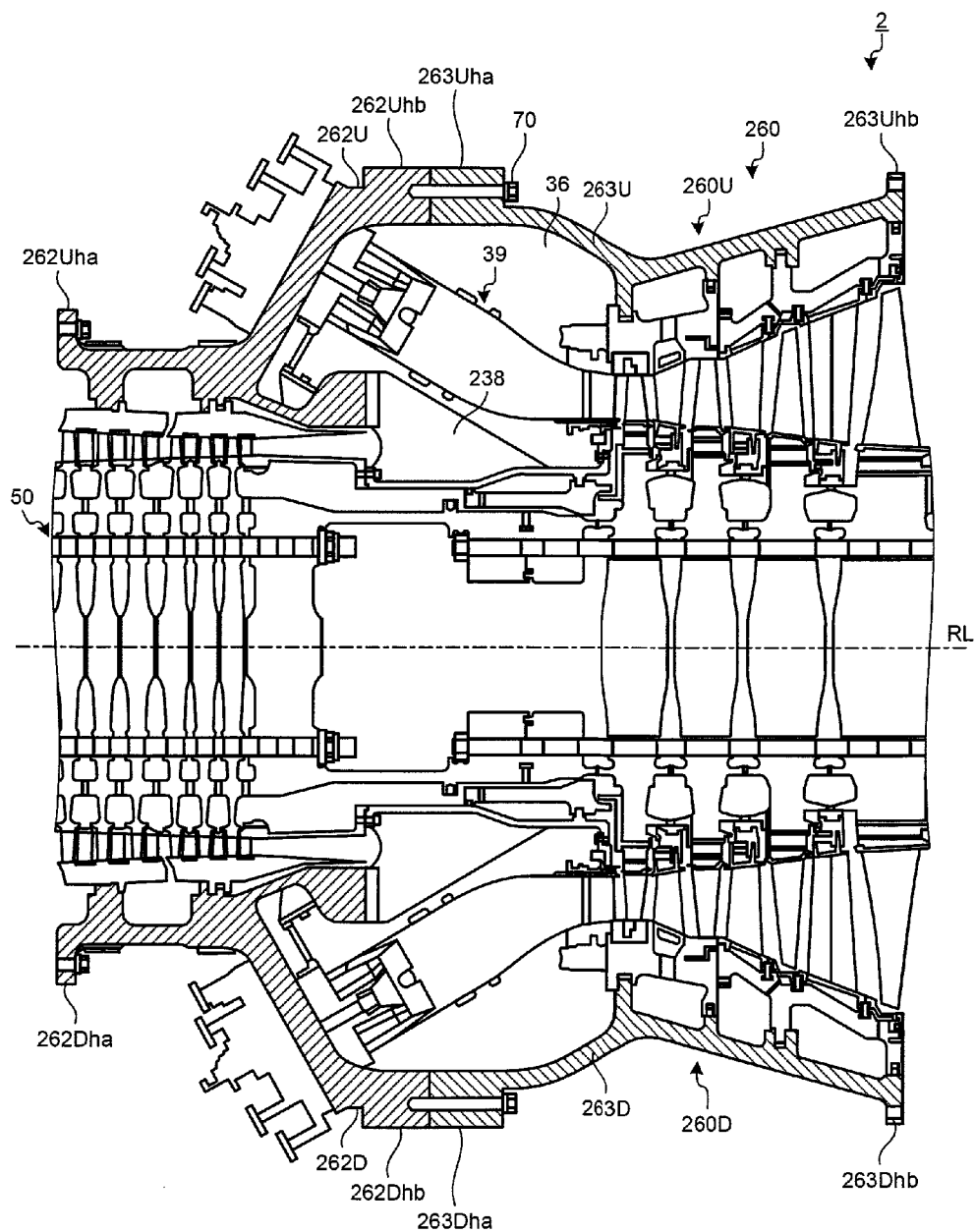
FIG. 7 is a schematic cross-sectional view of a connection portion of a second upper casing member and a third upper casing member, and a connection portion of a second lower casing member and a third lower casing member according to a second embodiment, cut by a plane including a rotational axis of a rotor.
Figure 8:
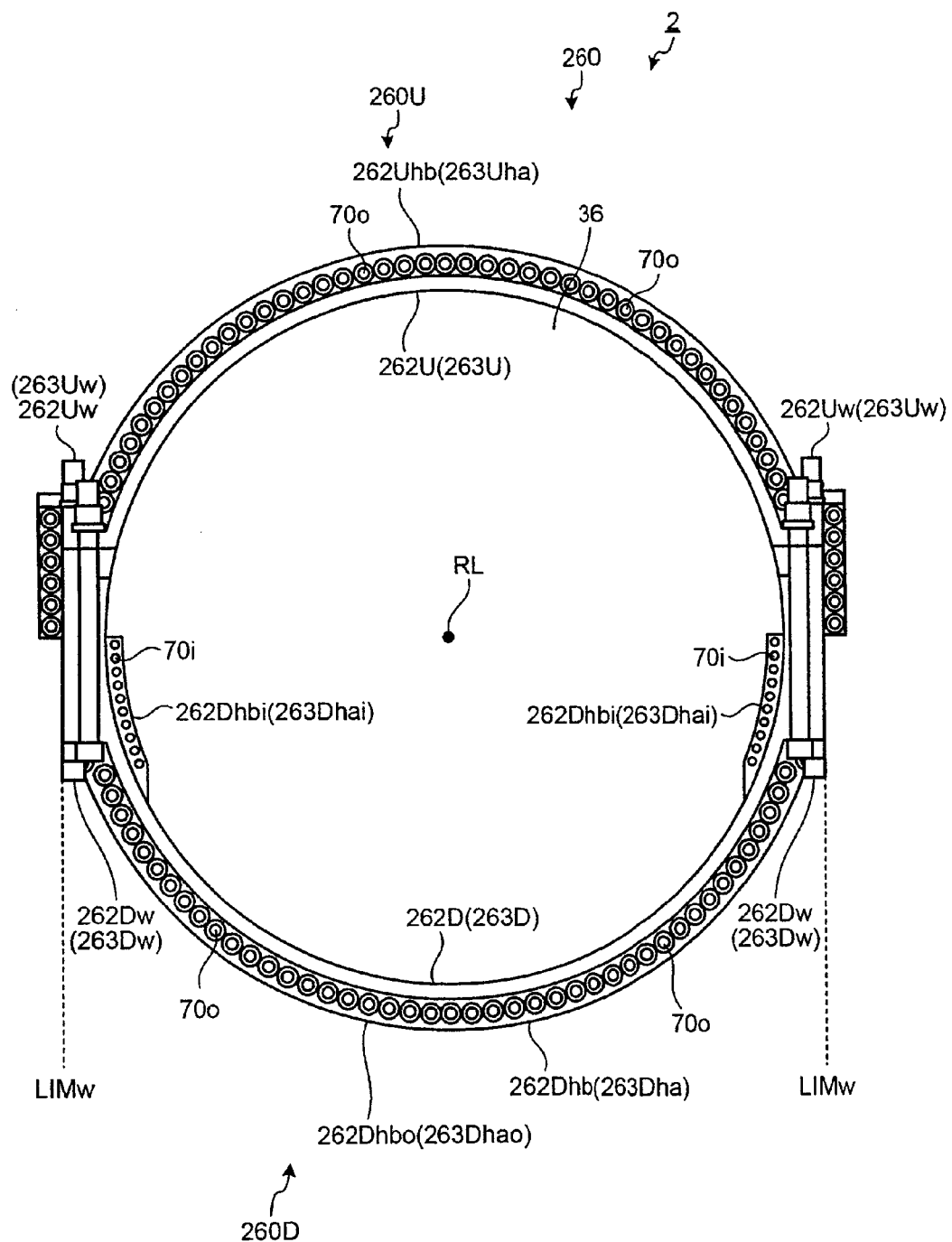
FIG. 8 is a schematic cross-sectional view of the connection portion of the second upper casing member and the third upper casing member, and the connection portion of the second lower casing member and the third lower casing member according to the second embodiment, cut by a plane perpendicular to the rotational axis of the rotor.

FIG. 7 is a schematic cross-sectional view of a connection portion of a second upper casing member and a third upper casing member, and a connection portion of a second lower casing member and a third lower casing member according to a second embodiment, cut by a plane including the rotational axis of the rotor. FIG. 8 is a schematic cross-sectional view of the connection portion of the second upper casing member and the third upper casing member, and the connection portion of the second lower casing member and the third lower casing member according to the second embodiment, cut by a plane perpendicular to the rotational axis of the rotor. The feature of a gas turbine 2 according to the present embodiment is that the flange is partially connected both at inside and outside of the combusting unit chamber 36.

An upper casing member 260U of the gas turbine 2, as illustrated in FIG. 7, includes a second upper casing member 262U and a third upper casing member 263U. The second upper casing member 262U includes a second upper-side first vertical flange 262Uha and a second upper-side second vertical flange 262Uhb. The third upper casing member 263U includes a third upper-side first vertical flange 263Uha and a third upper-side second vertical flange 263Uhb.

At the second upper-side second vertical flange 262Uhb, as illustrated in FIGS. 7 and 8, the second upper-side second vertical inner flange 62Uhbi is not formed inside the combusting unit chamber 36, unlike the second upper-side second vertical flange 62Uhb. The second upper-side second vertical flange 262Uhb is formed outside the combusting unit chamber 36 and projected only toward the outside in the radial direction of the rotor 50.

At the third upper-side first vertical flange 263Uha, the third upper-side first vertical inner flange 63Uhai is also not formed inside the combusting unit chamber 36, unlike the third upper-side first vertical flange 63Uha illustrated in FIG. 4. The third upper-side first vertical flange 263Uha is formed outside the combusting unit chamber 36, and projected only toward the outside in the radial direction of the rotor 50.

A lower casing member 260D of the gas turbine 2, as illustrated in FIG. 7, includes a second lower casing member 262D and a third lower casing member 263D. The second lower casing member 262D includes a second lower-side first vertical flange 262Dha and a second lower-side second vertical flange 262Dhb. The third lower casing member 263D includes a third lower-side first vertical flange 263Dha and a third lower-side second vertical flange 263Dhb.

At the second lower-side second vertical flange 262Dhb, as illustrated in FIGS. 7 and 8, a second lower-side second vertical inner flange 262Dhbi is partially formed inside the combusting unit chamber 36. The second lower-side second vertical inner flange 262Dhbi is a flange formed inside the combusting unit chamber 36 and projected toward the inside in the radial direction of the rotor 50.

The second lower-side second vertical flange 262Dhb includes a second lower-side second vertical outer flange 262Dhbo as an outer connection portion formed also at the outside of the combusting unit chamber 36 and projected toward the outside in the radial direction of the rotor 50. At the second lower casing member 262D, the second lower-side second vertical outer flange 262Dhbo is not formed at a portion where the second lower-side second vertical inner flange 262Dhbi is formed.

At the third lower-side first vertical flange 263Dha, a third lower-side first vertical inner flange 263Dhai is partially formed inside the combusting unit chamber 36. The third lower-side first vertical inner flange 263Dhai is a flange formed inside the combusting unit chamber 36 and projected toward the inside in the radial direction of the rotor 50.

The third lower-side first vertical flange 263Dha includes a third lower-side first vertical outer flange 263Dhao formed also at the outside of the combusting unit chamber 36 and projected toward the outside in the radial direction of the rotor 50. At the third lower casing member 263D, the third lower-side first vertical outer flange 263Dhao is not formed at a portion where the third lower-side first vertical inner flange 263Dhai is formed.

Upon transporting a casing 260, the width of the casing 260 is largest in the radial direction at portions where a second lower-side horizontal flange 262Dw and a third lower-side horizontal flange 263Dw are formed. The width is the size along the ground in the direction perpendicular to the traveling direction of a transport vehicle. The transport vehicle is capable of transporting a member with the width equal to or less than the maximum transport width LIMw illustrated in FIG. 8, on the load-carrying platform.

The second lower-side second vertical inner flange 262Dhbi, for example, is formed at a portion where the second lower-side horizontal flange 262Dw is formed. At this time, as described above, the second lower-side second vertical outer flange 262Dhbo is not formed at the portion where the second lower-side horizontal flange 262Dw is formed.

The third lower-side first vertical inner flange 263Dhai, for example, is formed at a portion where the third lower-side horizontal flange 263Dw is formed. At this time, as described above, the third lower-side first vertical outer flange 263Dhao is not formed at the portion where the third lower-side horizontal flange 263Dw is formed.

With the structure described above, in the gas turbine 2, upon transporting the lower casing member 260D, the width is reduced at the portions where the second lower-side horizontal flange 262Dw and the third lower-side horizontal flange 263Dw are formed. In this manner, upon transporting the lower casing member 260D, the risk that the portions where the second lower-side horizontal flange 262Dw and the third lower-side horizontal flange 263Dw are formed does not fall within the range of the maximum transport width LIMw can be reduced.

As illustrated in FIG. 8, when the second upper casing member 262U and the third upper casing member 263U are transported with the second lower casing member 262D and the third lower casing member 263D, a second upper-side horizontal flange 262Dw of the second upper casing member 262U and a third upper-side horizontal flange 263Dw of the third upper casing member 263U may not fall within the range of the maximum transport width LIMw. Accordingly, a method of transporting the casing 260 will now be described.

Figure 9:
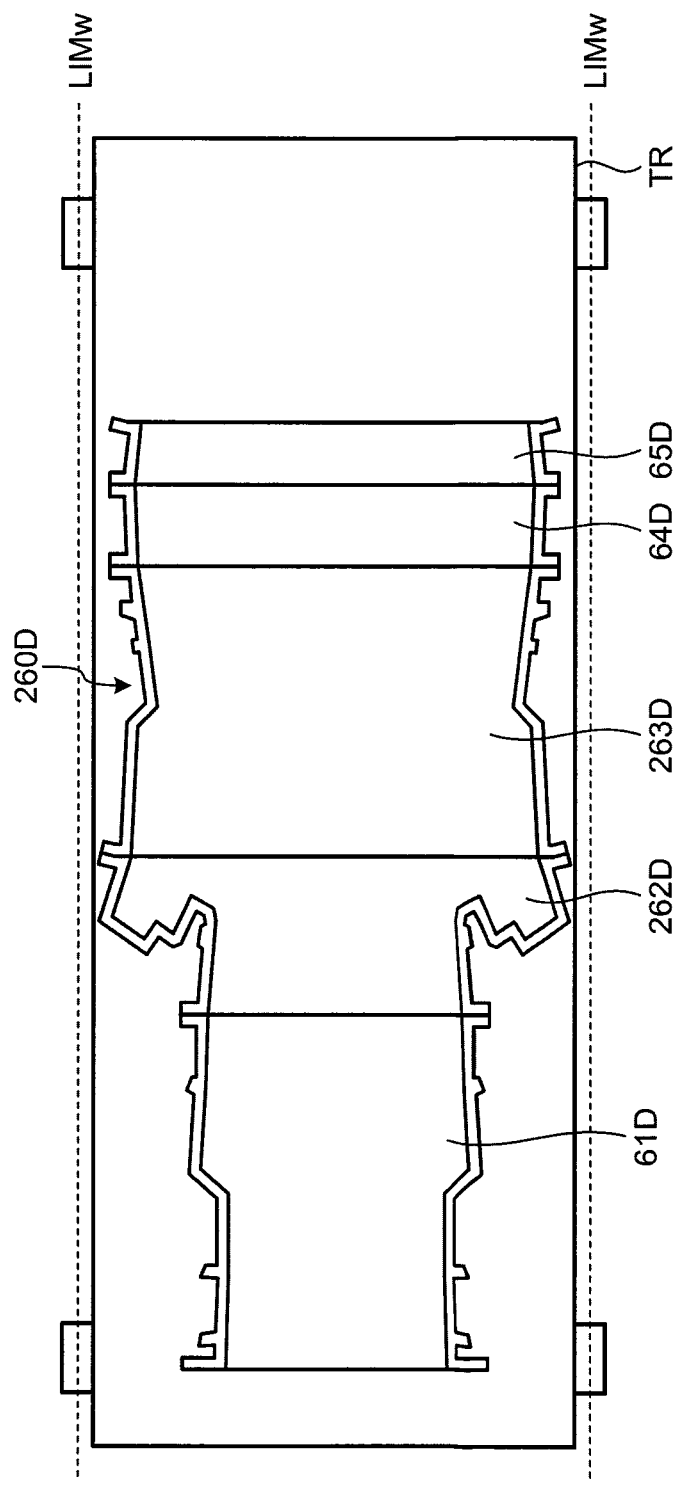
FIG. 9 is a schematic for explaining a method of transporting a lower casing member according to the second embodiment.

FIG. 9 is a schematic for explaining a method of transporting a lower casing member according to the second embodiment. As illustrated in FIG. 8, the second lower casing member 262D and the third lower casing member 263D of the lower casing member 260D fall within the range of the maximum transport width LIMw. The first lower casing member 61D, the fourth lower casing member 64D, and the fifth lower casing member 65D of the lower casing member 260D also fall within the range of the maximum transport width LIMw.

Accordingly, the lower casing member 260D, for example, as illustrated in FIG. 9, can be transported by a transport vehicle TR, in a state in which the first lower casing member 61D, the second lower casing member 262D, the third lower casing member 263D, the fourth lower casing member 64D, and the fifth lower casing member 65D are joined together.

If the lower casing member 260D can be loaded on the transport vehicle TR, the sixth lower casing member 66D illustrated in FIG. 2 can also be transported in a state joined together with the first lower casing member 61D, the second lower casing member 262D, the third lower casing member 263D, the fourth lower casing member 64D, and the fifth lower casing member 65D.

FIG. 10 is a schematic for explaining a method of transporting an upper casing member according to the second embodiment. Among the members of the upper casing member 260U, at least the second upper casing member 262U and the third upper casing member 263U illustrated in FIG. 7, are transported separately from the lower casing member 260D, as illustrated in FIG. 10. In this manner, in the gas turbine 2, the risk that the second upper-side second vertical flange 262Uhb and the third upper-side first vertical flange 263Uha illustrated in FIG. 7 do not fall within the range of the maximum transport height LIMh can be prevented.

As illustrated in FIGS. 7 and 8, in the gas turbine 2, the flange formed inside the combusting unit chamber 36 and projected toward the inside in the radial direction of the rotor 50 is formed at the portions where the second lower-side horizontal flange 262Dw and the third lower-side horizontal flange 263Dw are formed. However, the portion is not limited thereto. In the gas turbine 2, the flange formed inside the combusting unit chamber 36 and projected toward the inside in the radial direction of the rotor 50 may be formed at the portions where the second lower-side horizontal flange 262Dw and the third lower-side horizontal flange 263Dw are formed.

In the gas turbine 2, the flange formed inside the combusting unit chamber 36 and projected toward the inside in the radial direction of the rotor 50 and the flange formed outside the combusting unit chamber 36 and projected toward the outside in the radial direction of the rotor 50 may both be provided at a portion other than the portions where the second lower-side horizontal flange 262Dw and the third lower-side horizontal flange 263Dw are formed. In this manner, the strength of the connection portion of the second lower casing member 262D and the third lower casing member 263D is improved.

In the second lower casing member 262D and the third lower casing member 263D, the second lower-side second vertical inner flange 262Dhbi and the third lower-side first vertical inner flange 263Dhai may be connected by welding. In this manner, in the gas turbine 2, the gap between the second lower-side second vertical inner flange 262Dhbi and the third lower-side first vertical inner flange 263Dhai is filled, thereby sealing the combusting unit chamber 36 more appropriately.

The second upper casing member 262U and the third upper casing member 263U of the gas turbine 2, as illustrated in FIG. 7, are connected at the outside of the combusting unit chamber 36 by the bolt 70. Accordingly, the gas turbine 2 can be disassembled using the same procedure as that of the conventional gas turbine 3, during maintenance and inspection. In other words, upon maintaining and inspecting the gas turbine 2, the third upper casing member 263U is removed at first.

A worker then goes into the combusting unit chamber 36, and removes the bolt at the connection portion of the second upper casing member 262U and an intermediate shaft cover 238. In the gas turbine 2, the second upper casing member 262U is then removed. In this manner, upon maintaining and inspecting the gas turbine 2, the combustor 39 is exposed. Accordingly, the intermediate shaft cover 238 is not limited to the fitting type such as the intermediate shaft cover 38 fitted into the upper casing member 60U.

In the gas turbine 2, the flange formed inside the chamber and projected toward the inside in the radial direction of the rotor 50 is provided at the connection portion of the second lower casing member 262D, the third lower casing member 263D, which is likely to not fall within the range of the maximum transport width LIMw. However, the present embodiment is not limited thereto.

For example, in the gas turbine 2, the flange formed inside the chamber and projected toward the inside in the radial direction of the rotor 50 may also be provided at a connection portion of the first lower casing member 61D illustrated in FIG. 2 and the second lower casing member 262D illustrated in FIG. 7, a connection portion of the third lower casing member 263D illustrated in FIG. 7 and the fourth lower casing member 64D illustrated in FIG. 2, a connection portion of the fourth lower casing member 64D and the fifth lower casing member 65D, and a connection portion of the fifth lower casing member 65D and the sixth lower casing member 66D. Accordingly, in the gas turbine 2, the size of the casing 260 can be reduced.

INDUSTRIAL APPLICABILITY

In this manner, the gas turbine and the method for opening the chamber of the gas turbine according to the present embodiment can be advantageously used for the casing of the gas turbine being divided. In particular, the gas turbine and the method for opening the chamber of the gas turbine are suitable for a gas turbine in which the size of a casing at a divided part of the casing is reduced.

The invention claimed is:

1. A gas turbine comprising:
a rotator rotated by combustion gas produced by a combustor that burns fuel; and
a casing that is formed by connecting a plurality of casing members divided in plurality, the casing storing the rotator in an inside thereof, and including an inner connection portion for connecting a first casing member with a second casing member different from the first casing member among the casing members at the inside, wherein
the casing is divided by a plane perpendicular to the rotational axis of the rotator,
the inner connection portion is provided at a divided part divided by the plane perpendicular to the rotational axis,
the inner connection portion includes a first inner connection portion formed on the first casing member and projected in a direction toward the rotational axis of the rotator, and a second inner connection portion formed on the second casing member and projected in the direction toward the rotational axis of the rotator,
the first inner connection portion and the second inner connection portion are connected by a connection member, and
the inner connection portion is provided at a portion of a combusting unit chamber in which the combustor is disposed.

2. The gas turbine according to claim 1 wherein the first casing member and the second casing member are connected by the inner connection portion by welding.

3. The gas turbine according to claim 1, further comprising an outer connection portion, wherein the inner connection portion, in a connection portion of the first casing member and the second casing member, is provided inside the casing at a portion where the outer connection portion connected by a connection member is not disposed.

4. The gas turbine according claim 1, wherein the casing is divided into an upper casing member and a lower casing member by a plane including the rotational axis of the rotator, and the inner connection portion is not provided on the upper casing member, but only provided on the lower casing member.

5. The gas turbine according to claim 1, wherein the inner connection portion is circularly provided at an inside of a side periphery of the casing formed in a cylindrical shape along a circumferential direction over an entire periphery.

6. The gas turbine according to claim 5, further comprising an intermediate shaft cover that includes a portion fitted into the casing, that is supported inside the combusting unit chamber, and that supports the combustor.

7. The gas turbine according to claim 1, wherein at least one member of members of the casing is connected to a connection portion only provided outside the combusting unit chamber by a connection member.

8. The gas turbine according to claim 1, further comprising:
a first outer connection portion formed on an outside of the first casing member and projected toward an outside in the radial direction of the rotor; and
a second outer connection portion formed on an outside of the second casing member and projected toward an outside in the radial direction of the rotor, wherein
the first outer connection portion is provided at a rotational axis direction position corresponding to the first inner connection portion,
the second outer connection portion is provided at a rotational axis direction position corresponding to the second inner connection portion, and
the first outer connection portion and the second outer connection portion are connected by a connecting member.

9. A method for opening a chamber of a gas turbine that includes
a rotator rotated by combustion gas produced by a combustor that burns fuel, and
a casing that is formed by connecting a plurality of casing members divided in plurality, the casing storing the rotator in an inside thereof, and including an inner connection portion for connecting a first casing member with a second casing member different from the first casing member among the casing members at the inside, wherein the casing is divided by a plane perpendicular to a rotational axis of the rotator, and the inner connection portion is provided at a divided part divided by the plane perpendicular to the rotational axis, the inner connection portion includes a first inner connection portion formed on the first casing member and projected in a direction toward the rotational axis of the rotator, and a second inner connection portion formed on the second casing member and projected in the direction toward the rotational axis of the rotator, the first inner connection portion and the second inner connection portion are connected by a connection member, the inner connection portion is provided on a portion of a combusting unit chamber in which the combustor is disposed, and at least one member of members of the casing is connected to a connection portion only provided outside the combusting unit chamber by a connection member, the method comprising:

removing at least one member of members of the combusting unit chamber in which the combustor is disposed, from outside the combusting unit chamber.

10. The method for opening the chamber of the gas turbine according to claim 9, wherein at least one member of the members of the combusting unit chamber is removed from outside the combusting unit chamber, without removing an intermediate shaft cover that includes a portion fitted into the casing, that is supported inside the combusting unit chamber, and that supports the combustor.

* * * * *